United States Patent [19]

Becker

[11] 3,818,464

[45] June 18, 1974

[54] WIRING GUIDES FOR COMPUTER CORE MEMORIES

[75] Inventor: Frederick J. Becker, Duluth, Minn.

[73] Assignee: Duluth Scientific, Inc., Superior, Wis.

[22] Filed: July 26, 1971

[21] Appl. No.: 166,184

[52] U.S. Cl.................340/174 MA, 340/174 NC, 340/174 M, 29/203 MM, 29/604

[51] Int. Cl............................................... G11c 11/02

[58] Field of Search............340/174 MA, 174 PW, 340/174 NC, 174 M; 29/604, 203 MM; 226/91, 97; 28/1.4

[56] References Cited

UNITED STATES PATENTS

| | | | |
|---|---|---|---|
| 2,724,957 | 11/1955 | Griset, Jr. | 226/91 |
| 3,084,336 | 4/1963 | Clemons | 340/174 NC |
| 3,178,691 | 4/1965 | McCreary | 340/174 R |
| 3,218,615 | 11/1965 | Reimer et al. | 340/174 MA |
| 3,448,777 | 6/1969 | Scheffer | 29/604 |
| 3,534,343 | 10/1970 | Sallet | 340/174 PW |
| 3,707,705 | 12/1972 | Howell, Jr. et al. | 340/174 NC |

FOREIGN PATENTS OR APPLICATIONS

| | | | |
|---|---|---|---|
| 1,474,319 | 9/1969 | Germany | 340/174 NC |
| 244,406 | 10/1969 | U.S.S.R. | 340/174 MA |
| 891,927 | 3/1962 | Great Britain | 340/174 M |

OTHER PUBLICATIONS

Proceedings–Fall Joint Computer Conference, 1966, "A 500–Nanosecond Main Computer Memory Utilizing Plated–Wire Elements" by McCallister et al., pages 305–314.

*Primary Examiner*—Stanley M. Urynowicz, Jr.
*Attorney, Agent, or Firm* —Merchant, Gould, Smith & Edell

[57] ABSTRACT

A generally rectangularly-shaped thin sheet of insulating material having a plurality of spaced apart tunnels extending therethrough in the plane thereof positioned adjacent quadrants of computer cores with the tunnels aligned with rows of computer cores in the quadrants. The tunnels guide the wires during initial wiring procedures and maintain the wires correctly positioned subsequent to the wiring procedures. Further, the sheets act as hinges for folding stacks of quadrants in a computer memory.

5 Claims, 7 Drawing Figures

INVENTOR.
FREDERICK J. BECKER
BY
MERCHANT & GOULD
ATTORNEYS

INVENTOR.
FREDERICK J. BECKER
BY
MERCHANT & GOULD
ATTORNEYS

WIRING GUIDES FOR COMPUTER CORE MEMORIES

BACKGROUND OF THE INVENTION

1. Field of the Invention

At the present time computers use a variety of storage and memory devices, one of which is the ferrite core memory. Ferrite cores are small toroids of magnetic material which are capable of changing characteristics or states under the influence of electrical signals. These computer cores are constructed with an outside diameter of 18 mils, 14 mils and, in some experimental types, 10 and 12 mils. The tendency is to construct smaller cores because they require less switching time and smaller amounts of power.

To form computer memories the computer cores are fixedly attached in an upright position to a planar surface of a mounting board in spaced apart rows and columns. Wires are then threaded through the cores in a variety of organizations, the most popular of which have become known as 2D, 2½D, 3D, 4 wire and 3D 3 wire. All of these organizations are described in computer literature.

Because the cores are extremely small, the wiring is difficult and expensive. Further, minor changes or variations in the positions of wires can adversely effect the operation of a particular quadrant and/or the overall storage or memory device. At the present time, when wiring quadrants of computer cores by hand, long steel needles having the wire attached thereto, are utilized. The needles, once engaged through the first core of a row of cores, pass readily along a row of cores in a quadrant. However, each time the wire is to be passed through a new row in the same or an adjacent quadrant, the needle must be started in the first core again, which requires a substantial amount of time. Further, when returning the wire through a row of cores in the same quadrant a 180° loop must be formed at the ends of the rows and, while variations in these loops adversely affect the operation of the quadrant, it is very difficult to maintain these loops uniform.

2. Description of the Prior Art

Because of the complexity of the various wiring organizations and because of the extremely small size of the computer cores, most of the wiring of computer cores is performed by hand. No means are presently available to aid an individual wiring a memory to thread the wire through a plurality of rows of cores in adjacent quadrants without taking time to start the needle in each successive row. Further, no means are available to aid the individual wiring the quadrant in forming the various end loops and outlet connections in a uniform manner throughout a quadrant and in successive quadrants.

SUMMARY OF THE INVENTION

The present invention pertains to wiring guides and permanent wire holders for use with computer memories having a plurality of computer cores fixedly mounted on a board in spaced apart rows and columns including a thin strip or sheet of electrical insulating material having a plurality of parallel tunnels extending therethrough in the plane of the strip, each tunnel having a substantially uniform diameter slightly larger than the diameter of the wires to be guided and said tunnels being spaced apart a distance equal to the spacing between rows of computer cores.

It is an object of the present invention to provide new and improved wiring guides and permanent wire holders for use with computer memories having a plurality of computer cores fixedly mounted on a board in spaced apart rows and columns.

It is a further object of the present invention to provide an interconnecting wire guide and hinge member for computer core memory stacks.

It is a further object of the present invention to provide improved computer core memory quadrants.

It is a further object of the present invention to provide improved methods and apparatus for wiring computer core memories.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figures 1, 2, 3:
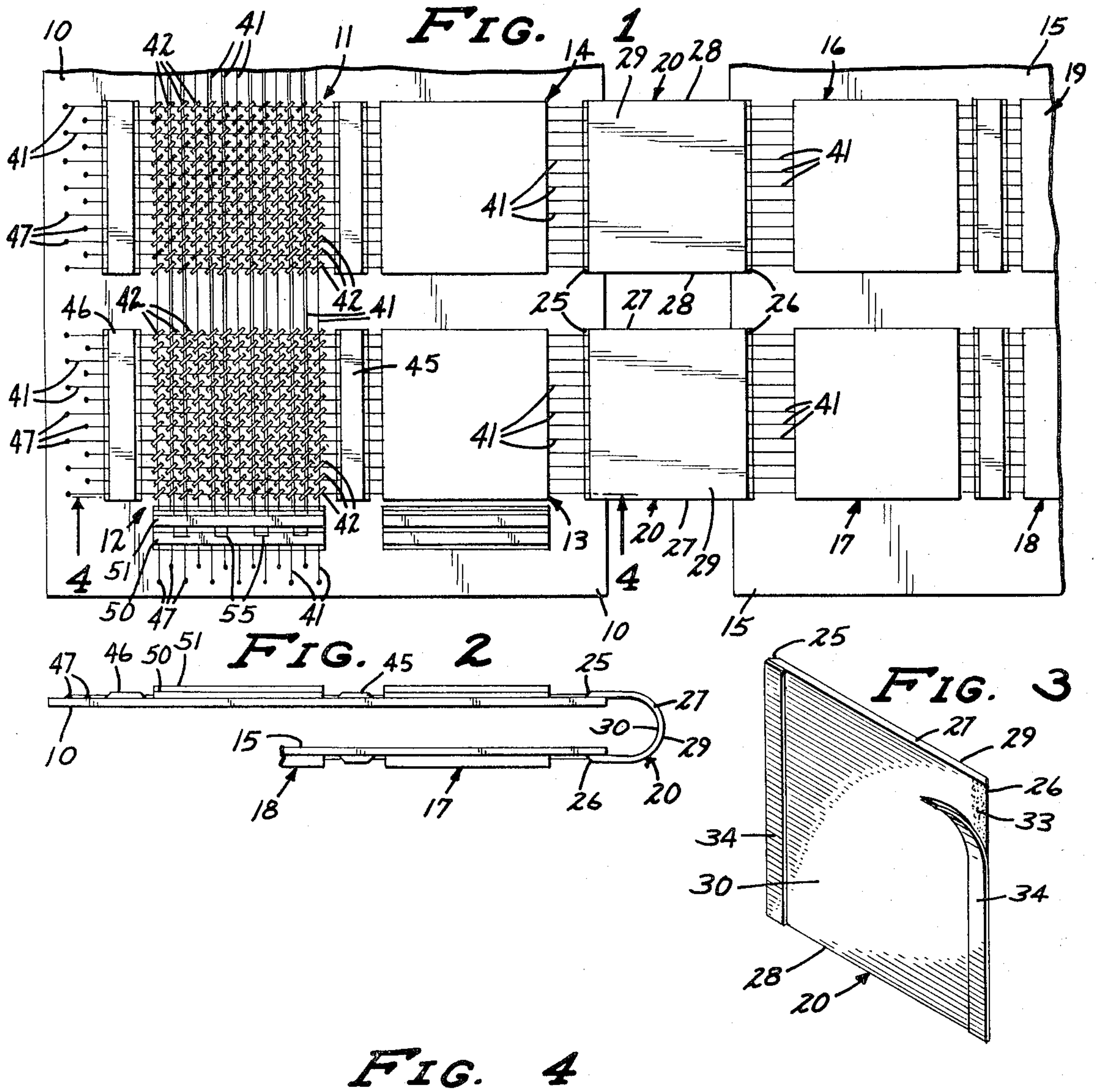
FIG. 1 is a view in top plan of a partially wired portion of a computer core memory utilizing the present wiring guides.
FIG. 2 is a view in side elevation of the apparatus illustrated in FIG. 1 folded into a stack.
FIG. 3 is a bottom view in perspective of a wiring guide with an embodiment of mounting means affixed thereto.

Referring to FIG. 1 the numeral 10 designates a base having a plurality of computer core quadrants 11, 12, 13 and 14 mounted thereon. A second base 15 has quadrants 16, 17, 18 and 19 mounted thereon. Portions of the base 10 and 15 are broken away and it will be understood that any desired number of quadrants can be mounted on the bases 10 and 15. Further, the cores of the quadrants may be affixed directly to the bases 10 and 15 or may be affixed to mounting boards, which are in turn affixed to the bases 10 and 15, in any of the methods and utilizing any of the apparatus well known to those skilled in the art. No specific wiring organization is illustrated in the quadrants and the memory stack since the core memories are simply illustrated to illustrate the use of the wiring guides and it will be understood by those skilled in the art that any desired wiring organization may be utilized.

In FIG. 1, the bases 10 and 15 are spaced apart and wire guide-hinge members 20 are affixed therebetween. Since a plurality of hinge members 20 are utilized and since each of these hinge members 20 is substantially similar, only one hinge member 20 will be described in detail. The hinge member 20 is a generally rectangularly shaped sheet of flexible material having opposed sides 25 and 26, ends 27 and 28, an upper surface 29 and a lower surface 30. The hinge member 20 is positioned between the bases 10 and 15 with the side 25 adjacent the quadrant 13 and the side 26 adjacent the quadrant 17 and a portion of the lower surface 30 overlying portions of the bases 10 and 15 adjacent the spaced apart edges thereof. The lower surface 30 of the hinge member 20 must be fixedly attached to the upper surface of the bases 10 and 15 to prevent relative movement therebetween.

Referring to FIG. 3, one embodiment of means for fixedly attaching the lower surface 30 of the hinge member 20 to the upper surfaces of the bases 10 and 15 is illustrated. In this embodiment strips of adhesive 33 are affixed to the lower surface 30 of the hinge member 20 adjacent the sides 25 and 26. The particular adhesive 33 utilized is a pressure sensitive adhesive and protective strips 34 are positioned thereover for storage purposes. To affix the hinge member 20 to the bases 10 and 15, the protective strips 34 are removed from the strips of adhesive 33 and the hinge member 20 is positioned in the desired orientation on the bases 10 and 15 with the strips of adhesive 33 overlying the upper surfaces of the bases 10 and 15 and the hinge member 20 is simply pressed onto the bases 10 and 15 to hold it firmly in place. In some uses, which will be described presently, of the wire guides the adhesive strips 33 may be utilized as a spacer to orient the wire guides the desired amount above the upper surface of the bases 10 and 15. It should be understood, however, that a great variety of materials may be utilized to affix the wire guide to the upper surface of the bases 10 and 15 and the adhesive strips described are simply one embodiment thereof.

Figures 6, 7:
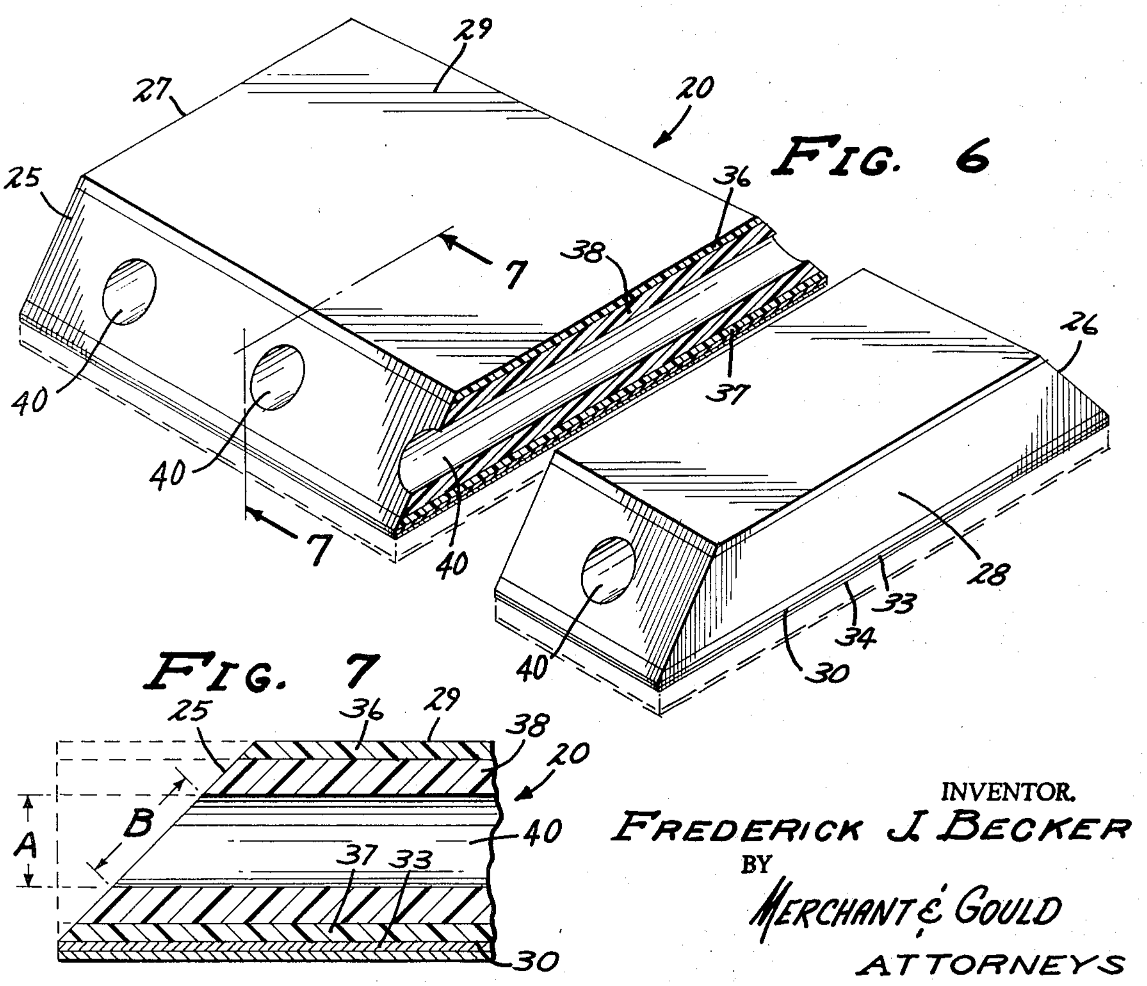
FIG. 6 is an enlarged view in perspective of a wiring guide, portions thereof broken away and shown in section.
FIG. 7 is an enlarged sectional view as seen from the line 7—7 in FIG. 6.

The wire guide-hinge members 20 must be constructed of material which is sufficiently flexible to allow the base 15 to be folded into a parallel underlying relationship with the base 10, as illustrated in FIG. 2. One possible embodiment of the wire guide-hinge member 20 which satisfies the flexibility requirement is illustrated in FIGS. 6 and 7. Referring to FIGS. 6 and 7, it can be seen that the hinge member 20 is constructed with thin upper and lower layers of material, designated 36 and 37 respectively, and a relatively thick center layer 38 sandwiched therebetween. In this embodiment the center layer 38 is formed from an easily laminated plastic having a relatively low dielectric constant to provide good electrical characteristics for the wire guides. It has been found for example that a plastic sold under the trademark "FEP Teflon" provides the desired characteristics. The upper and lower layers 36 and 37 are laminated onto the center layer 38 to give the overall assembly strength and a relatively tough, flexible plastic, such as that sold under the trademark "Kapton" is preferred. It should be understood that the wire guide-hinge member 20 might be constructed of a single layer of material or any desired number of laminations of similar or differing materials and any such embodiments which come within the scope of this invention are intended to be covered herein.

The center layer 38 of the hinge member 20 has a plurality of tunnels 40 extending therethrough from the side 25 to the side 26. The tunnels 40 are designed to receive therethrough wires 41, which wires 41 are utilized to wire the various quadrants 11–14 and 16–19. The diameter of the tunnels 40 must be larger than the diameter of the wires 41 so that the wires 41 can be slidably received therethrough. The diameter of the wires 41 will differ for various computer manufacturers, for different computers and for different sizes of cores and other components but for purposes of this description the wires 41 may be assumed to have approximately a three mil diameter. With a 3 mil diameter wire some typical dimensions for the hinge member 20 are as follows. The diameter of the tunnels 40 is approximately 5 mils and the overall thickness of the center layer 38 is approximately 7 mils with the upper and lower layers 36 and 37 having a thickness of approximately 1 mil each. The length of the hinge member 20 between the ends 27 and 28 depends upon the number of cores 42 in the vertical columns (referring to FIG. 1) of the quadrants. The tunnels 40 have a distance between the centers equal to the distance between centers of horizontal rows of cores 42 in the adjacent quadrants 13 and 17. Further, the number of tunnels 40 should coincide with the number of rows, or the number of cores 42 in a vertical column of the adjacent quadrants 13 and 17, so that the size of the quadrants 13 and 17 determines the length of the hinge member 20 between the ends 27 and 28.

The sides 25 and 26 of the hinge member 20 are cut at an angle substantially less than 90° relative to the lower surface 30 thereof. In the present embodiment the sides 25 and 26 are cut at an angle of approximately 45° so that the lower surface 30 extends outwardly beyond the upper surface 29 and the openings of the tunnels 40 ar elliptically shaped. Cutting the sides of the hinge members 20 to provide an opening into the tunnels 40 which is directed outwardly and upwardly in a generally elliptical shape, provides a substantially enlarged opening for receiving the wires 41 during initial wiring procedures. For example, where the sides 25 and 26 are cut at an angle of 45° to the lower surface 30 the dimension B in FIG. 7 is approximately 1.414 times as large as the dimension A. Thus, the initial threading of the wires 41 through the tunnels 40 is greatly simplified.

In wiring the quadrants 11–14 and 16–19 in FIG. 1, hinge members 20 are positioned between the bases 10 and 15, as described above, so that tunnels 40 therethrough are aligned with the rows of cores 42. Each wire 41 passing through rows of cores 42 and between the quadrants 13 and 17 passes through a tunnel 40 in the hinge member 20. The tunnels 40 maintain a uniform spacing between the wires 41 so that characteristics of the various circuits of the quadrants 13 and 17 do not change and the hinge member 20 allows the quadrants 13 and 17 to be wired simultaneously and positioned in a stack. Whereas prior art methods required individual wiring of the bases 10 and 15, after which they were positioned in a stack and then connected by additional wiring. Thus, the hinge member 20 greatly simplifies the construction of the stacks, reduces the number of connections which must be made, thereby, reducing the number of man hours of initial work as well as improving the reliability and other electrical characteristics.

As illustrated in the various figures, the wire guide making up the hinge members 20 is utilized in a vareity of different configurations. In general, the basic construction of the wire guide is similar for all of the configurations and the dimensions will be similar when the various configurations are used on the same quadrants, but the materials may vary somewhat, if desired, since only the hinge members 20 need a specific flexibility. A generally rectangularly shaped relatively thin strip of wire guide is affixed to the upper surface of the base 10 between the quadrants 12 and 13 to serve as a jumper 45. Jumper 45 is the same length as the hinge member 20 and has the same number of tunnels 40 therethrough with the openings positioned in an edge which is cut at an angle substantially less than 90° to the lower surface thereof. The jumpers 45 are utilized to reduce the distance between the columns of cores 42 in the adjacent quadrants 12 and 13. The jumper 45 also maintains the wires extending between the quadrants 12 and 13 correctly positioned and spaced. A similar jumper 46 is positioned parallel with the opposite side of the quadrant 12, between the quadrant 12 and a plurality of terminals 47 for the wires 41.

Figure 4:
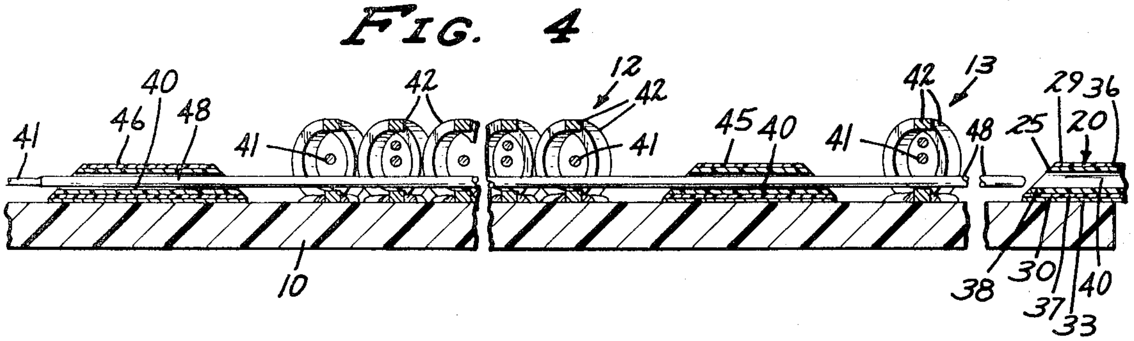
FIG. 4 is an enlarged sectional view as seen from the line 4—4 in FIG. 1, portions thereof broken away.

In wiring quadrants of cores, it is common practice to utilize an elongated steel needle 48 having one end of a wire 41 fixedly attached to the rear end thereof. Since the needle 48 is relatively stiff it can be aligned with a row of cores 42 and threaded therethrough, carrying the wire 41 with it. However, because of the size of the needle 48 relative to the opening through the cores 42, when quadrants, such as quadrants 12 and 13, are positioned in spaced apart relationship the needle must be aligned with a row of cores 42 in the quadrant 12 and pushed partially therethrough after which it must be aligned with the counterpart row of cores in the quadrant 13 and pushed therethrough. Each time the operator must stop to align the needle 48 with a row of cores 42 additional time and effort is expended. By positioning the jumper 46 with the tunnels 40 therethrough in alignment with the rows of cores in the quadrant 12 and the jumper 45 between the quadrants 12 and 13 with the tunnels 40 therethrough in alignment with the rows of cores 42, the needle 48 need only be inserted into the tunnels 40 of the jumper 46 and it will be guided through as many quadrants and tunnels as required (see FIG. 4). Thus, the time and labor of the person wiring the computer memory is greatly reduced since the number of times the needle 48 must be aligned with a row of cores 42 is greatly reduced. Further, the jumpers 45 and 46 maintain the wires 41 correctly spaced and in the desired position to improve the characteristics of the quadrants 12 and 13. In addition to the above advantages, the jumpers 45 and 46 guide the wires 41 during wiring of the quadrant 12 and relieve any strain on the cores 42 tending to break the cores 42 from the base 10.

Figure 5:
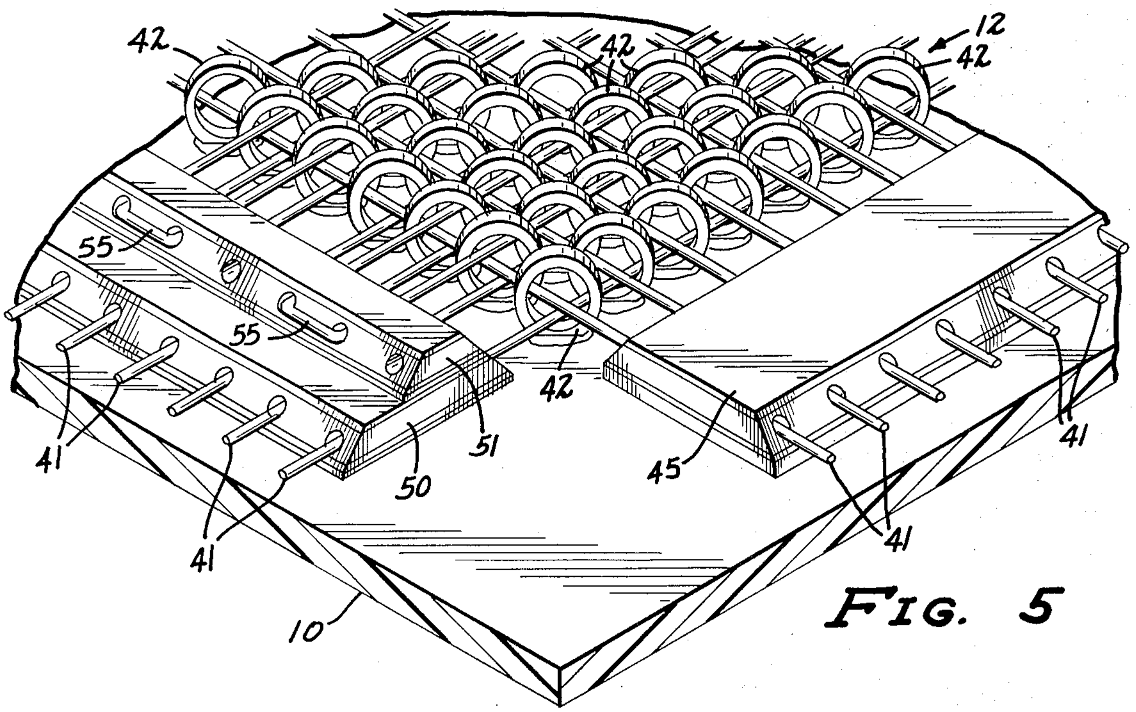
FIG. 5 is an enlarged view in perspective of a portion of the core memory illustrated in FIG. 1.

Two strips of wire guide 50 and 51 are positioned in a double-deck arrangement between the quadrant 12 and the edge of the base 10, as illustrated in FIGS. 1 and 5. The lower strip 50 is somewhat wider than the upper strip 51 and, in the present wiring organization is utilized between the quadrant 12 and a plurality of terminals 52 similar to the jumper 46. Referring specifically to FIG. 5, it can be seen that the jumper 45 is shimmed upwardly away from the upper surface of the base 10 somewhat higher than the strip 50 so that wires 41 passing through the tunnels of the jumper 45 and the cores 42 lie above the wires 41 passing through the tunnels 40 of the strip 50 and the cores 42. The strip 51, in this embodiment, is utilized to form sense loops 55 so that all of the sense loops 55 are uniformly constructed to improve the characteristics thereof. It should of course be understood that loops might be formed in the lower strip 50 and/or in the upper strip 51 if desired, depending upon the wiring organization of the quadrant 12. It should further be understood that double-deck wiring guides might be included between quadrants 11 and 12, if desired, depending upon the particular wiring organization of the quadrants 11 and 12. Thus, the double-deck strips 50 and 51 improve the characteristics of the quadrants by aiding the person wiring the quadrants to consistently form uniform loops and to maintain the wires correctly positioned.

Thus, an improved hinge member has been disclosed which greatly simplifies and improves the initial wiring and continued operation of stacks of core memories for computers. Further, similarly constructed wiring guides are utilized as jumpers and double-decked to aid a person wiring the core memories by simplifying the wiring operations and correctly spacing the wires during the wiring and subsequent operation of the core memory. While hinge members, jumpers and double-deck strips will be constructed with substantially similar dimensions in any one core memory, it should be understood that the materials utilized therein need not be the same, but as a practical matter probably will be similar. Thus, utilizing the wiring guide in the various configurations of hinge members, jumpers and double-deck strips, provides improved quadrants of cores and improved computer core memories.

While I have shown and described specific embodiments of this invention, further modifications and improvements will occur to those skilled in the art. I desire it to be understood, therefore, that this invention is not limited to the particular forms shown and I intend in the appended claims to cover all modifications which do not depart from the spirit and scope of this invention.

What is claimed is:

1. Wiring guides and permanent wire holders for use with computer memories having a plurality of computer cores fixedly mounted on a board in spaced apart rows and columns comprising:

a. an elongated relatively thin strip of electrical insulating material with a substantially uniform thickness, between upper and lower planar surfaces, greater than the diameter of wires to be guided thereby;

b. said strip of material defining a plurality of parallel tunnels extending transversely therethrough and lying in the plane of said strip with opposed openings of said tunnels in opposed longitudinally extending edges of said strip;

c. each of said tunnels having a uniform diameter slightly larger than the diameter of the wires to be guided for receiving said wires slidably therethrough;

d. said tunnels being spaced apart a distance equal to the spacing between rows of computer cores;

e. means for attaching said strip to the board with said tunnels in alignment with said rows; and f. wires extending through said tunnels and said rows of computer cores.

2. Wiring guides and permanent wire holders as set forth in claim 1 wherein at least one of the longitudinally extending edges having tunnel openings therein is formed at an angle substantially less than 90° to the lower surface of the strip.

3. An improved computer core quadrant for a computer memory comprising:

a. a generally rectangularly-shaped mounting board;

b. a plurality of computer cores fixedly mounted on said board in rows and columns;

c. at least one elongated strip of electrical insulating material having a thickness greater than the diameter of wires to be utilized to wire said quadrant, said strip defining a plurality of parallel tunnels extending transversely therethrough and lying in the plane of said strip with opposed openings of said tunnels in opposed longitudinally extending edges of said strip and each tunnel having a uniform diameter slightly larger than the diameter of the wires;

d. said strip being mounted on said board so that the tunnels are aligned with rows of said cores; and e. wires extending through said cores and the tunnels of said strip in a desired organization with at least some of said wires extending between two tunnels and forming substantially uniform 180° loops therebetween.

4. An improved computer core quadrant as set forth in claim 3 wherein the longitudinally extending, outwardly directed edge of the strip forms an angle substantially less than 90° with the upwardly directed surface of the board.

5. An improved computer core quadrant as set forth in claim 3 wherein at least two strips are utilized with a second strip being mounted in overlying relationship to the first strip and the tunnels of the second strip are parallel with and overlying the tunnels of the first strip.

* * * * *